United States Patent Office
3,459,757
Patented Aug. 5, 1969

3,459,757
IMIDAZOLIDINES
William Blythe Wright, Jr., Woodcliff Lake, N.J., and Herbert Joseph Brabander, Nanuet, N.Y., assignors to American Cyanamid Company, Stamford, Conn., a corporation of Maine
No Drawing. Filed Oct. 22, 1965, Ser. No. 502,436
Int. Cl. C07d 57/00, 29/02
U.S. Cl. 260—294                                        7 Claims

ABSTRACT OF THE DISCLOSURE

The preparation of substituted phenyl imidazolidines by several methods such as cyclization of a straight compound to produce the desired imidazolidinone ring structure with substituents present, are described. The compounds prepared by these methods are useful for their central nervous system activity, such as tranquilizers or muscle relaxants.

---

This invention relates to substituted imidazolidines. More particularly, it relates to substituted phenyl imidazolidines and method of preparing the same.

The novel imidazolidines of the present invention may be illustrated by the following formula:

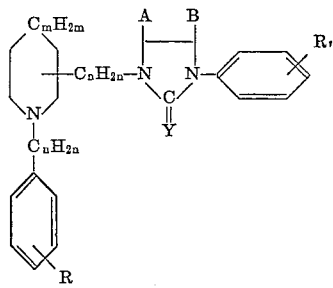

wherein R and $R_1$ are selected from the group consisting of hydrogen, halogen, lower alkoxy, lower alkyl and trifluoromethyl, A and B are selected from the group consisting of hydrogen and lower alkyl, Y is selected from the group consisting of oxygen and sulfur, $m$ is an integer 0 to 1 and $n$ is an integer 0, 1 and 2.

This invention includes the acid addition salts of the above compounds which in general, can be prepared by treating the base compounds with acids such as for example, hydrochloric, sulfuric, fumaric, maleic, tartaric and the like.

The compounds of the present invention possess central nervous system activity at non-toxic doses and, as such, are useful as highly active tranquilizers. The present compounds have been tested and found to have tranquilizing properties which show a desirably wide spread between the doses producing sedative action and toxic symptoms such as paralysis tor lethality.

The compounds of the present invention may be solids or liquids at room temperature as their free bases. As such, they are relatively insoluble in water but are soluble in or miscible with most organic solvents such as, for example, lower alkyl alcohols, esters, acetone, chloroform and the like. These compounds form acid addition salts with strong acids such as hydrochloric acid, sulfuric acid, perchloric acid and the like. These salts are, in general, soluble in water, methanol, ethanol etc., but relatively insoluble in benzene, ether, petroleumether, and the like.

The compounds of this invention may be prepared by the following method which has been found most desirable.

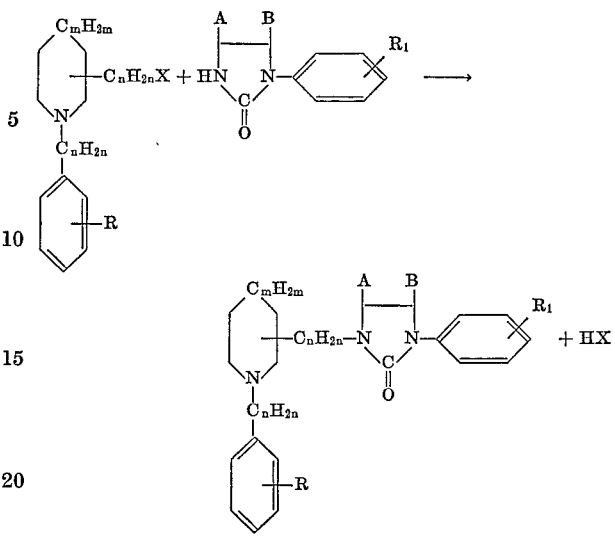

wherein R, $R_1$, A, B, $m$, and $n$ are as defined above and X is a reactive halogen or arylsulfonyloxy radical. The imidazolidinone is dissolved in an inert solvent such as, for example, diethyleneglycol dimethyl ether (diglyme), and reacted with a condensing agent such as sodium hydride and then with an appropriate aminoalkyl halide. The reaction is best carried out at temperatures in the range of 30–200° C. for a period of from 30 minutes to 4 hours. The product can be recovered by methods well known in the art and described hereinafter in the examples.

The compounds of the present invention can also be prepared by several other methods, one group of which have in common the cyclization of a straight chain compound to produce the desired imidazolidinone ring structure with the substituents present thereon. One method found useful in producing the compounds of the present invention is the cyclization of substituted carbanilates which can be illustrated by the following reaction:

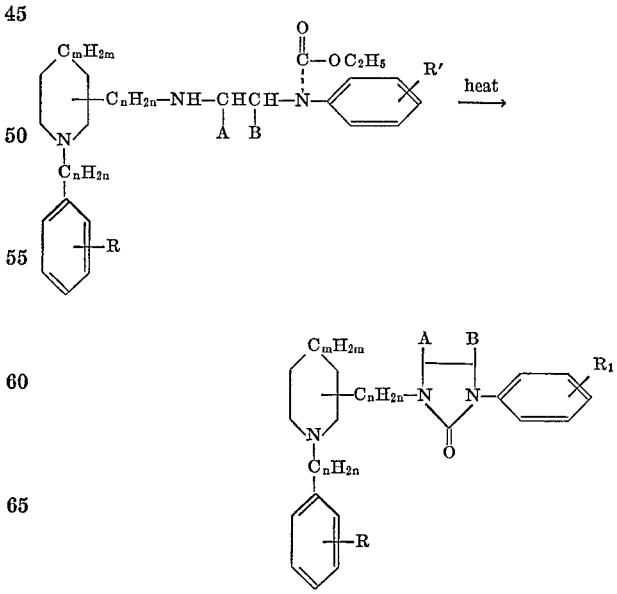

in which R, $R_1$, A, B, $m$, and $n$ are as defined above. The present compounds can also be prepared by the cyclization of N-substituted (aminoalkyl)ureas. This reaction can be illustrated as follows:

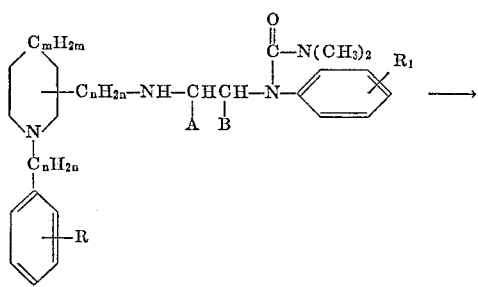

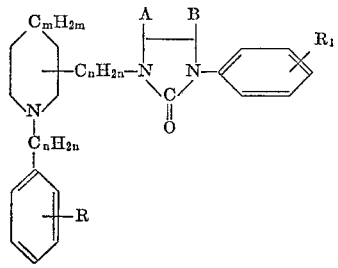

in which R, R₁, A, B, *m,* and *n* are as defined above. The starting material, namely, N-substituted (aminoalkyl) ureas may be prepared by the various methods described in the literature.

Other methods of preparing the compounds of the present invention may be illustrated as follows.

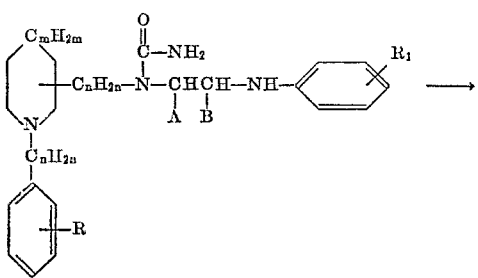

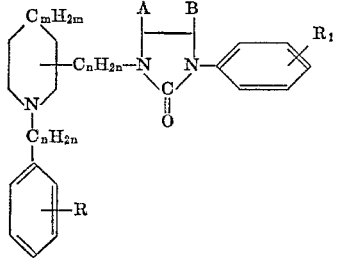

and

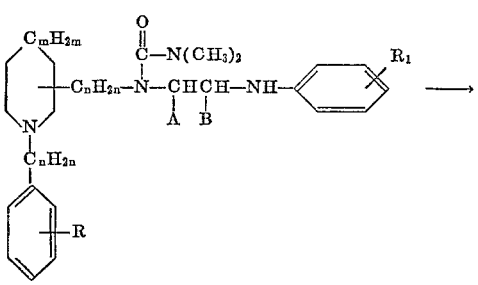

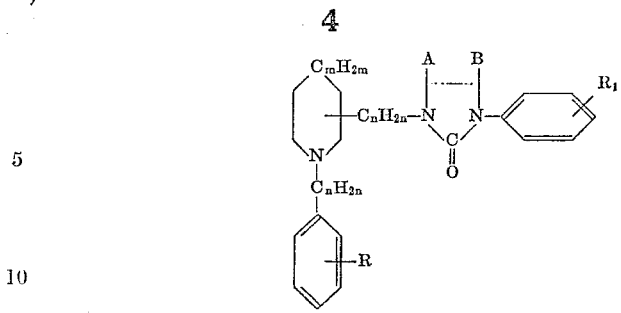

in which R, R₁, A, B, *m,* and *n* are as defined above.

The various cyclization reactions illustrated above can be carried out, for example, by heating the reagents alone or in the presence of a solvent inert to the reactants at a temperature within the range of about 100° C. to about 250° C. for a period of from about 30 minutes to about 10 hours. Further methods of preparing the compounds of the present invention can be used, such as, the reaction of N-substituted aminoalkylene-N'-aryl alkylenediamines with cyclizing agents such as ethyl chloroformate, carbonyldiimidazole, phosgene, ethyl carbonate and the like. The preparation of the present compounds by this latter method can be illustrated as follows:

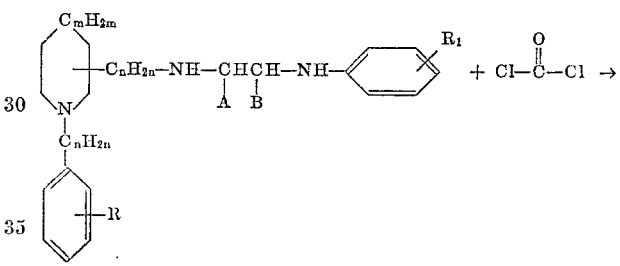

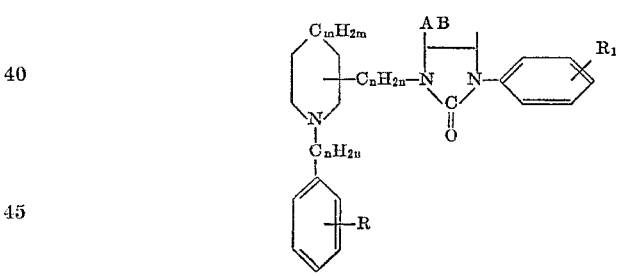

in which R, R₁, A, B, *m,* and *n* are as defined hereinbefore. The corresponding imidazolidinethiones are also a part of this invention and in some cases they can be prepared by processes similar to those described above. It is, however, preferable to prepare these compounds by special procedures, such as by the reaction of the imidazolidinone with phosphorus pentasulfide as described hereinafter in the examples.

The compounds of the present invention show CNS depressant properties such as hypnotic and muscle relaxant type activity. This activity is indicated by several procedures. For example, a test which indicates hypnotic and/or muscle relaxant type activity is represented by the following rod walking test. Groups of 6 mice each are tested for their ability to walk across a horizontal rod in a normal manner after receiving graded interperitoneal doses of a compound. A median effective dose (RWD) is estimated.

A test which indicates tranquilizing activity is represented by a measure of the reduction in motor activity. One-half this dose is given to a group of 5 mice and a 5 minute count of motor activity is recorded (acetophotometer). Counts of $\leqq 250$ are considered to indicate a specific reduction (more than two standard deviations) of activity at a dose causing only minimal impairment of neurological function as measured by rod walking ability. Compounds that appeared to reduce motor activity ($\leqq$ 250 count) are administered to additional groups of 5 mice at graded doses and tested similarly. The dose (MDD) which causes a 50% reduction of motor activity (a count of 250) is estimated.

As a test for toxicity or margin of safety, the compounds that did specifically reduce motor activity are given to 10 mice at a dose of 10× MDD. The compounds that did not reduce motor activity are given to 10 mice at a dose of 4× RWD. If more than 50% of the mice die within 24 hours, the compound is rejected for reasons of toxicity or low margin of safety. If ≦ 50% of the mice die, the compound is considered interesting for further study.

Interesting compounds are then tested for their ability to cause mice to fall off an inclined (60°) screen and to lose their righting reflex. Doses are estimated that cause 50% of the mice to fall off the inclined screen (ISD) and to lose their righting reflex (LRD).

The products of the present invention as transquilizers can be incorporated in various pharmaceutical forms such as tablets, capsules, pills and so forth, for immediate or sustained release, by combining with suitable carriers. The daily dose may vary from 10 mg. to 1000 mg. They may be in the form of dosage units for single therapeutic dose or in small units for multiple dosages or in larger units for division into single doses. Obviously, in addition to the therapeutic tranquilizing compound there may be present excipients, binders, fillers and other therapeutically inert ingredients necessary in the formulation of the desired pharmaceutical preparation.

The following specific examples illustrate the preparation of representative compounds of the present invention. Parts are by weight unless otherwise indicated.

Example 1.—Preparation of 1-[(1-benzyl-3-pyrrolidinyl)-methyl]-3-(m-chlorophenyl)-2-imidazolidinone fumarate A mixture of 3.84 parts of 50% sodium hydride (in mineral oil) in 50 parts of diglyme is stirred and a solution of 13.7 parts of 1-(m-chlorophenyl)-2-imidazolidinone in 80 parts of diglyme is added. The reaction mixture is stirred and a solution of 12.6 parts of 1-benzyl-3-chloromethylpyrrolidine in 30 parts of diglyme is added. The mixture is heated at reflux temperature for 4 hours, filtered and concentrated to remove the solvent. The residue is shaken with 150 parts of 1 N hydrochloric acid and 100 parts of benzene. The benzene layer is separated and discarded and the lower two layers are again shaken with benzene. The lower viscous layer is separated and contains the desired product. It is made alkaline with aqueous sodium hydroxide and the product is extracted into benzene. The benzene layer is washed with saturated salt solution, dried over magnesium sulfate and concentrated. The residue is dissolved in ethanol and ethanolic fumaric acid is added. The precipitate is filtered and recrystallized from ethanol. The 1-[(1-benzyl-3-pyrrolidinyl methyl]-3-(m-chlorophenyl)-2-imidazolidinone fumarate melts at 158–159° C. This compound is a highly active CNS depressant and shows motor depressant activity at about 3 mg./kg.

Example 2.—Preparation of 1-[(1-benzyl-3-pyrrolidinyl)-methyl] - 3 - (m - bromophenyl) - 2 - imidazolidinone fumarate When 1-(m-bromophenyl)-2-imidazolidinone is substituted for 1-(m-chlorophenyl)-2-imidazolidinone in the procedure of Example 1, the above compound, melting point 167–169° C. is obtained.

Example 3.—Preparation of 1-[(1-benzyl-3-pyrrolidinyl)-methyl] - 3 - (m-methoxyphenyl) - 2 - imidazolidinone hydrochloride This compound, melting point 158–160° C., is obtained when 1(m-methoxyphenyl)-2-imidazolidinone is reacted with 1-benzyl-3-chloromethylpyrrolidine by the procedure of Example 1. The corresponding hydrochloride is obtained when the base is treated with ethanolic hydrochloric acid.

Example 4.—Preparation of 1-[(1-benzyl-3-pyrrolidinyl)-methyl] - 4,5 - dimethyl 3-(m-trifluoromethylphenyl)-2-imidazolidinone When 4,5 - dimethyl-3-(m-trifluoromethylphenyl)-2-imidazolidinone is substituted for 1-(m-chlorophenyl)-2-imidazolidinone in the procedure of Example 1, the above compound is obtained.

Example 5.—Preparation of 1-[(1-p-chlorophenethyl-3-pyrrolidinyl)ethyl] - 3 - (m-chlorophenyl)-2-imidazolidinone When 2-(1-p-chlorophenethyl - 3 - pyrrolidinyl)ethyl chloride is substituted for 1-benzyl-3-chloromethylpyrrolidine in the procedure of Example 1, this compound is obtained.

Example 6. — Preparation of 1-[(1-m-bromobenzyl-3-pyrrolidinyl)methyl]-3-(p-bromophenyl) - 2 - imidazolidinone The above compound is obtained when 1-(p-bromophenyl)-2-imidazolidinone is reacted with 1-(m-bromobenzyl)-3-chloromethylpyrrolidine by the procedure of Example 1.

Example 7.—Preparation of 1-[(1-benzyl-3-pyrrolidinyl)-ethyl]-3-(m-tolyl)-2-imidazolidinone When 1-(m-tolyl)-2-imidazolidinone is reacted with 2-(1-benzyl-3-pyrrolidinyl)ethyl bromide by the procedure of Example 1, the above compound is obtained.

Example 8.—Preparation of 1-(1-benzyl-3-piperidinyl)-3-phenyl-2-imidazolidinone

A mixture of 9.4 parts of N-(1-benzyl-3-piperidinyl)-N'-phenylethylenediamine and 5.7 parts of N,N'-carbonyl diimidazole in 100 parts of tetrahydrofuran is allowed to stand for 24 hours and is then heated for 1 hour at reflux temperature. The solvent is removed and the residue is shaken with dilute sodium hydroxide and benzene. The benzene layer is washed with saturated salt solution, and concentrated. The 1-(1-benzyl-3-piperidinyl)-3-phenyl-2-imidazolidinone is further purified by partition chromatography on diatomaceous earth.

Example 9.—Preparation of 1-(m-chlorophenyl)-3-[(1-p-methoxybenzyl - 3 - pyrrolidinyl)methyl] - 2 - imidazolidinone This compound is obtained when 1-(m-chlorophenyl)-2-imidazolidinone is reacted with 1-(p-methoxybenzyl)-3-chloromethylpyrrolidine by the procedure of Example 1.

Example 10.—Preparation of 1-(m-chlorophenyl)-3-[(1-o-methylbenzyl-3-pyrrolidinyl)methyl]-2-imidazolidinone When 1-(m-chlorophenyl)-2-imidazolidinone is reacted with 1-(o-methylbenzyl)-3-chloromethylpyrrolidine by the procedure of Example 1, the above compound is obtained.

Example 11.—Preparation of 1 - (o - chlorophenyl) - 3 - [(1 - p - trifluoromethylbenzyl - 3 - pyrrolidinyl)methyl] - 2 - imidazolidinone When the compound 1-(o-chlorophenyl)-2-imidazolidinone is reacted with 1-(p-trifluoromethylbenzyl)-3-chloromethyl pyrrolidine using the procedure of Example 1, the above product is obtained.

Example 12.—Preparation of 1-[(1-benzyl-3-pyrrolidinyl)methyl]-3-(m-chlorophenyl)-2-imidazolidinethione A mixture of 3 parts of phosphorus pentasulfide, 3.5 parts of 1-[(1-benzyl-3-pyrrolidinyl)methyl]-3-(m-chlorophenyl)-2-imidazolidinone and 20 parts of xylene is heated at reflux temperature for 24 hours. A mixture of 50 parts of 2 N sodium hydroxide and 100 parts of benzene is added and the mixture is warmed and triturated until the product dissolves in the organic layer. The organic layer is washed with water, dried over magnesium sulfate and concentrated. The product is further purified by chromatography over diatomaceous earth.

Example 13.—Preparation of 1-[(1-p-fluorobenzyl-3-pyrrolidinyl)methyl]-3-(m-fluorophenyl)-2-imidazolidinone When 1-(m-fluorophenyl)-2-imidazolidinone and 1-(p-fluorobenzyl)-3-chloromethylpyrrolidine are reacted by the procedure of Example 1, the above compound is obtained.

Example 14.—Preparation of 1-phenyl-3-[(1-phenyl-3-pyrrolidinyl)methyl]-2-imidazolidinone This compound is obtained when N-[(1-phenyl-2-pyrrolidinyl)methyl] - N' - phenylethylenediamine is reacted with N,N'-carbonyl diimidazole by the procedure of Example 8.

We claim:
1. An imidazolidine of the formula:

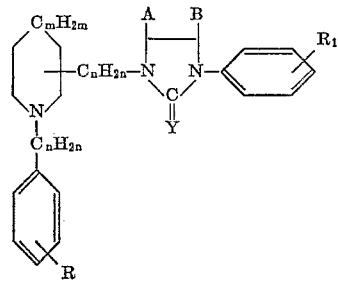

wherein R and $R_1$ are selected from the group consisting of hydrogen, halogen, lower alkoxy, lower alkyl and trifluoromethyl, A and B are selected from the group consisting of hydrogen and lower alkyl, Y is selected from the group consisting of oxygen and sulfur, $m$ is an integer 0 and 1 and $n$ is an integer 0, 1 and 2 and pharmaceutically acceptable acid addition salts.

2. A compound according to claim 1 wherein the imidazolidine is 1-[(1-benzyl-3-pyrrolidinyl)methyl]-3-(m-chlorophenyl)-2-imidazolidinone.

3. A compound according to claim 1 wherein the imidazolidine is 1-[(1-benzyl-3-pyrrolidinyl)methyl]-3-(m-bromophenyl)-2-imidazolidinone.

4. A compound according to claim 1 wherein the imidazolidine is 1-[(1-benzyl-3-pyrrolidinyl)methyl]-3-(m-methoxyphenyl)-2-imidazolidinone.

5. A compound according to claim 1 wherein the imidazolidine is 1[(1-benzyl-3-pyrrolidinyl)methyl]4,5-dimethyl-3-(m-trifluoromethylphenyl)-2-imidazolidinone.

6. A compound according to claim 1 wherein the imidazolidine is 1-(1-benzyl-3-piperidinyl)-3-phenyl-2-imidazolidinone.

7. A compound according to claim 1 wherein the imidazolidine is 1-[(1-benzyl-3-pyrrolidinyl)methyl]-3-(m-chlorophenyl)-2-imidazolidinethione.

References Cited
UNITED STATES PATENTS
3,196,152   7/1965   Wright et al. _____ 260—294

FOREIGN PATENTS
972,003   10/1964   Great Britain.

HENRY R. JILES, Primary Examiner
S. D. WINTERS, Assistant Examiner

U.S. Cl. X.R.
260—293, 294, 309, 326, 999